Patented Oct. 12, 1948

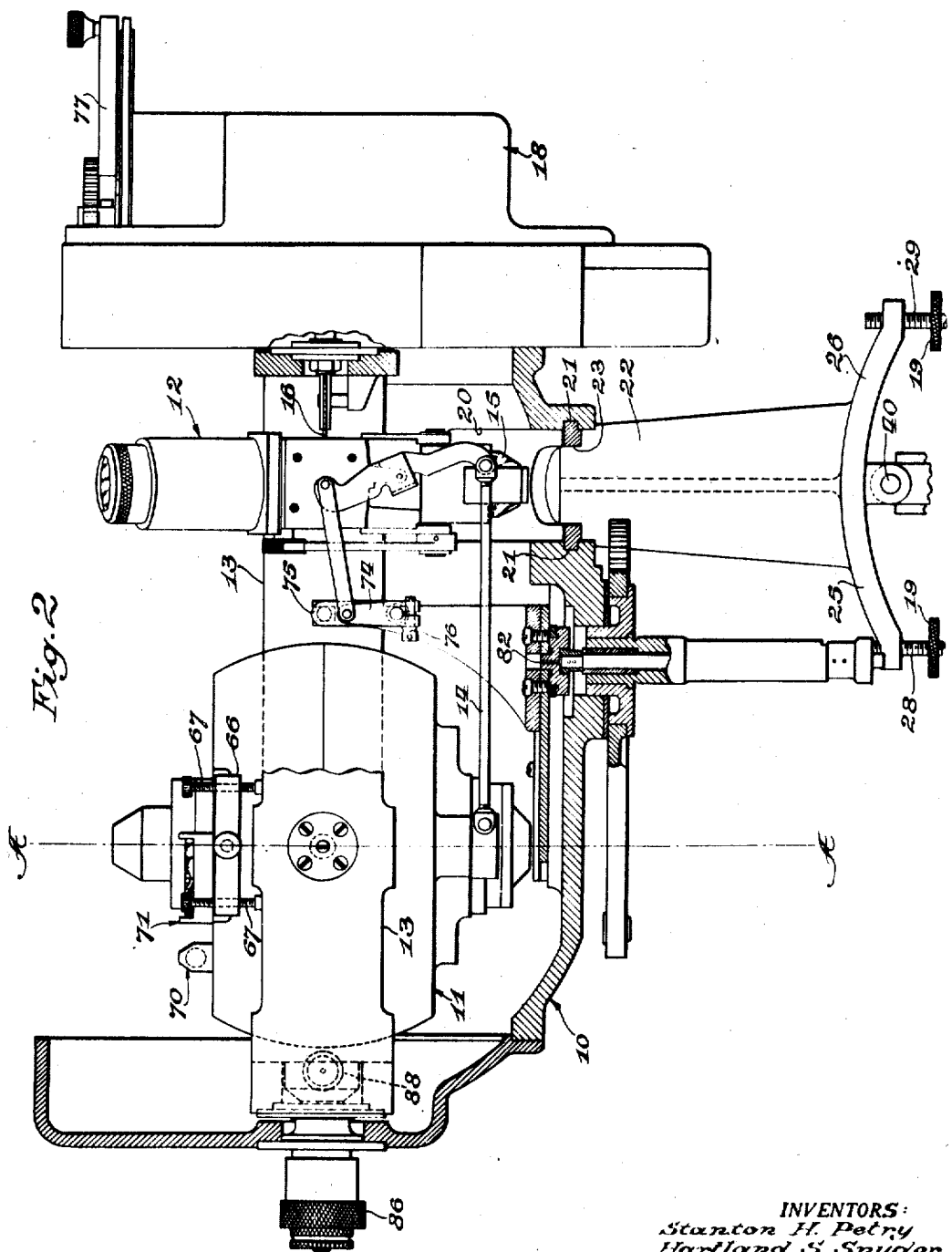

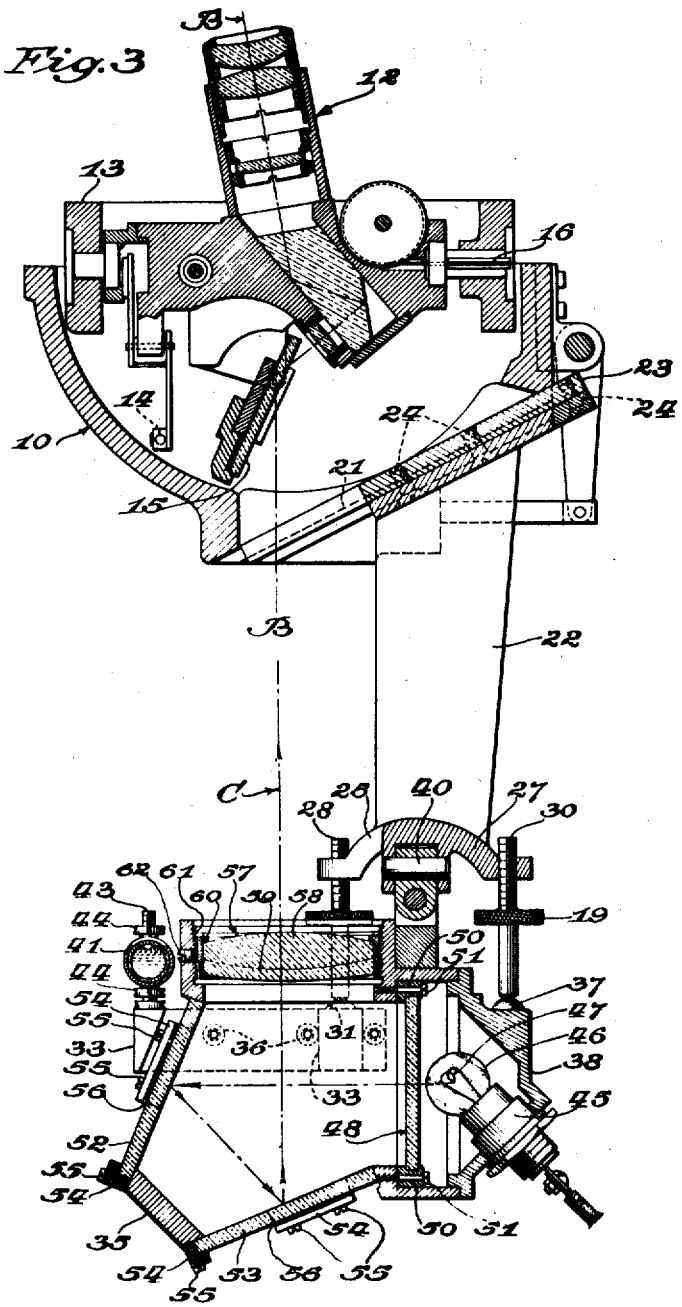

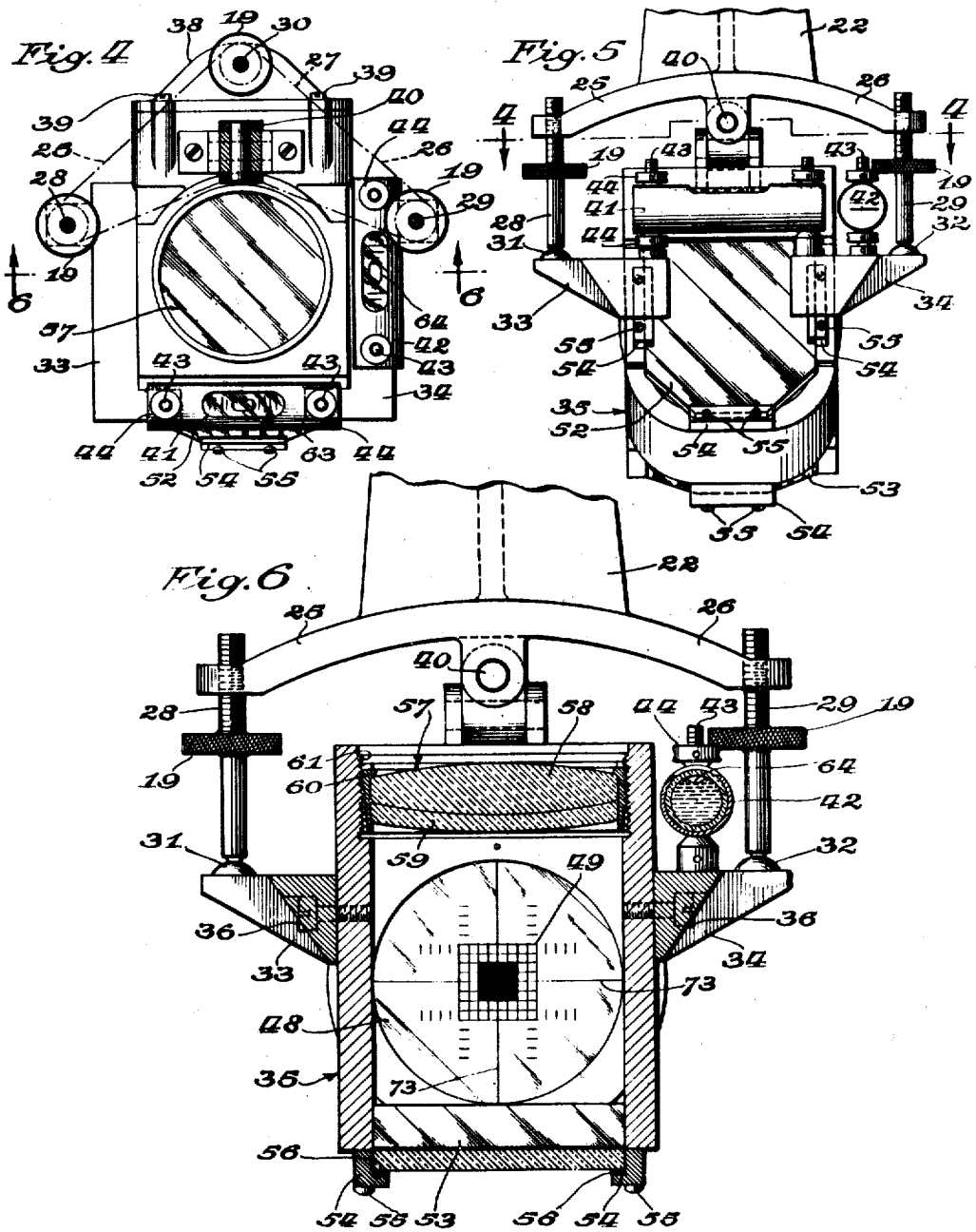

2,451,409

UNITED STATES PATENT OFFICE 2,451,409

PORTABLE COLLIMATOR APPARATUS FOR TESTING THE GYROSCOPE AND OPTICAL SYSTEM OF BOMBSIGHTS

Stanton H. Petry, Evanston, and Hartland S. Snyder, Chicago, Ill., assignors to Victor Adding Machine Co., Chicago, Ill., a corporation of Illinois Application February 19, 1945, Serial No. 578,774

7 Claims. (Cl. 88—1)

1

This invention relates to a testing device for use in checking and adjusting the telescope and static balance of a gyro-stabilized bombsight.

Generally speaking, it is the purpose of this invention to provide a bombsight testing instrument of unusually compact form which includes a built-in collimator.

At the present time bombsight testing equipment, with which we are familiar, has certain definite disadvantages when considered from the standpoint of size, cost, accuracy and weight.

It may be further pointed out that as air bases are moved or advanced from one locality to another, transportation of heavy and bulky bombsight test equipment becomes a serious and vital factor.

It is the broad purpose of our invention to obviate the above-mentioned objections found in connection with present day testing equipment for gyro-stabilized bombsights by providing improved test equipment which is readily portable, which weighs approximately ten pounds, and which is economical to manufacture, highly accurate in operation, and capable of being used without removing the bombsight from the plane.

A further object is to provide novel testing equipment for a gyro-stabilized bombsight which is removably supported by the sight itself, an instrument capable of testing all the important functions of the sight, and one the size and weight of which permits it to be carried by the plane and included as a part of the plane's equipment.

A still further object of the present invention resides in the use of a collimator equipped with sensitive level bubbles, special mounting bracket, means for universally adjusting the position of the collimator relative to the bracket, and a specially designed reticle within the collimator.

More limited objects of the invention are to provide an efficient and relatively simple testing instrument for gyro-stabilized bombsights, composed in most part of simple elements that may be readily fabricated into a compact and sturdy structure possessing the features above pointed out and operating in a highly satisfactory manner.

The invention, associated with a gyro-stabilized bombsight, is illustrated in the accompanying drawings, and while we shall proceed to describe the same in detail, it will be understood that the invention, in its broader aspect, is not limited to the structural details shown further than is required by the terms of the appended claims.

In the drawings:

2

Fig. 2 is a side elevation partly in central vertical section along the line 2—2 of Fig. 1.

Fig. 3 shows a central vertical section of the invention along the line 3—3 of Fig. 1 and its installation upon a bombsight.

Figs. 4, 5 and 6 are fragmentary detail views of the test collimator, Fig. 4 being a plan view partly in horizontal section along the line 4—4 of Fig. 5, and Fig. 6 a side elevation partly in vertical section along the line 6—6 of Fig. 4.

Figure 7:
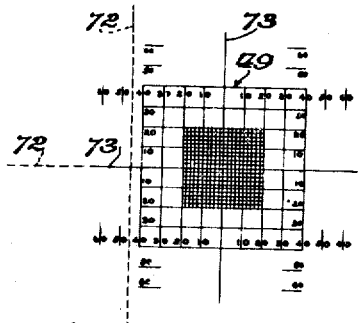

Fig. 7 is an enlarged diagrammatic view of the collimator reticle graphically showing the movement of the telescope cross hairs relative to the reticle during certain tests hereinafter fully explained.

Figure 8:
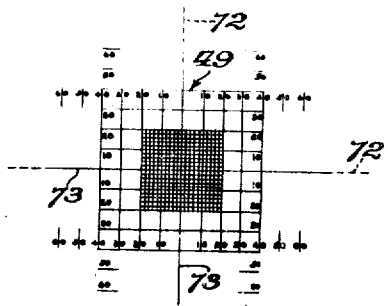
Figure 9:
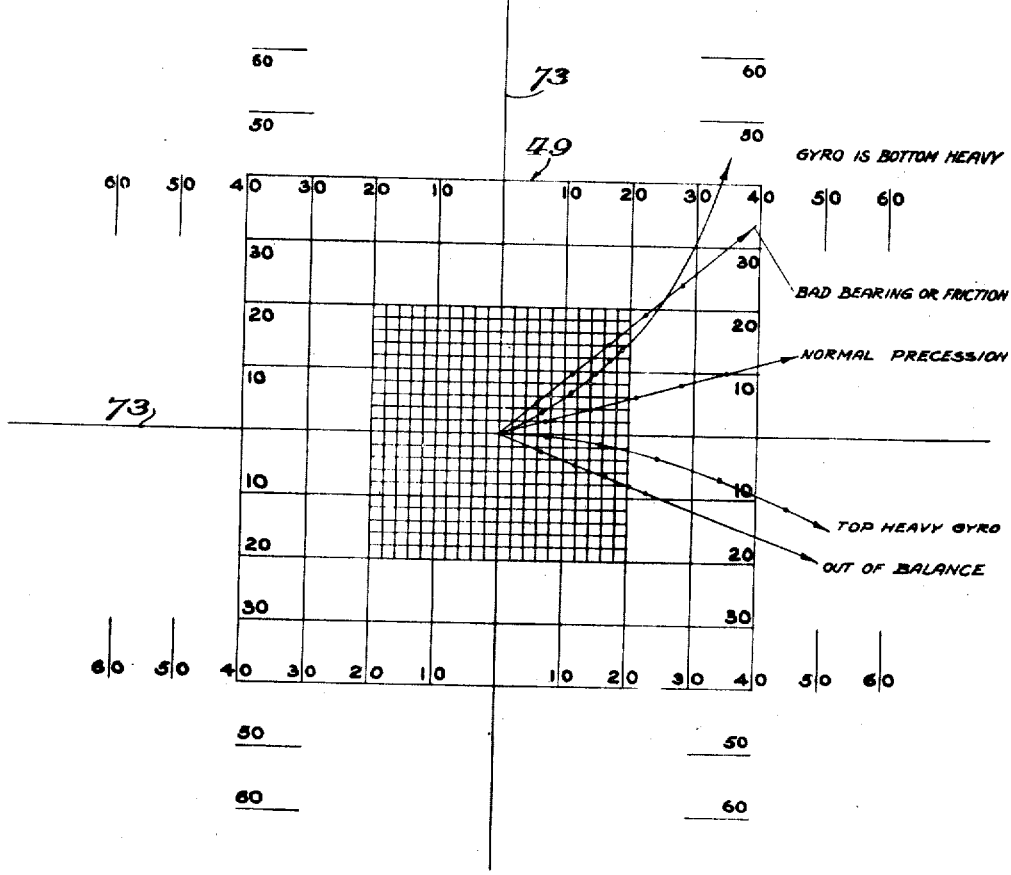

Fig. 8 is a view similar to Fig. 7 showing the cross hairs of the telescope in exact registry or at zero position relative to the principal axes of the grid and, Fig. 9 is a highly magnified view of the grid depicting typical readings at aproximately two minute intervals of a bombsight under varying conditions.

General description

It is believed that the detailed description of our improved test collimator for a gyro-stabilized bombsight will be more readily understood if it is read with a general knowledge of the structure and functions performed by the sight and the general manner in which the objects of our invention are attained.

There is illustrated herein one form of gyro-stabilized bombsight with which our invention may be used. As shown, this sight consists generally of a housing 10 (Fig. 1), within which a gyro 11 and a telescope 12 are housed for pivotal movement within a cardan 13, the cardan in turn being pivotally mounted with respect to the housing 10 in the conventional manner. The gyro and telescope are connected to one another through a differential link 14 (Fig. 2) in a manner and for reasons more fully explained hereinafter, and mirror 15 of telescope 12 is moved by a cable 16 and drum 17 the latter being driven by a computer shown generally by reference character 18.

The lower half of housing 10 is provided with an opening or window 20 for the telescope mirror 15 and this opening is normally covered by a glass plate (not shown) fitted within grooves 21 in the side walls of said opening. It will be observed from Fig. 3 that our improved test collimator is supported within this opening by the grooves 21 in a manner presently disclosed.

Generally speaking, the more important tests to be performed on the sight through the use of our novel test collimator are as follows:

1. The optical axis of telescope 12 is brought parallel to the spin axis of the gyro 11.
2. The section of the bombsight which is stabilized in azimuth is set parallel to the longitudinal cross hair of the telescope so that no movement of said cross hair is observed when introducing trail into the sight.
3. With a known value of trail and a definite amount of drift angle introduced into the sight, observed movement of the cross hairs with respect to the collimator reticle should equal the trail times the sine of the drift angle.
4. With the gyro running and uncaged, and the telescope cross hairs set to zero position relative to the collimator reticle, the direction and amount of travel of the cross hairs during a definite period of time in all four cardinal headings will indicate the precession of the gyro caused by earth's rotation, out of balance, faulty bearings, etc.

Test collimator

Referring now to a detailed description of our invention, and for the present to Fig. 3, the reference numeral 22 designates a bracket the upper end of which has a locating plate 23 secured thereto by screws 24. This plate is slidably received by the grooves 21 in housing 10, as best illustrated in Figs. 2 and 3, and in this manner the test collimator is removably attached to and supported by the lower half of the bombsight housing 10. The lower end of bracket 22 is provided with three arms 25, 26 and 27 (Figs. 3 and 4) drilled and threaded to receive the threaded ends of levelling or jack screws 28, 29 and 30 respectively. The lower swivel ends 31 and 32 of said screws 28 and 29 respectively engage level brackets 33 and 34 which extend outwardly from, and are secured to, the collimator housing 35 by screws 36, whereas the swivel end 37 of jack screw 30 engages a flat surface on the lamp housing 38 as clearly shown in Fig. 3. This lamp housing is preferably attached to the collimator housing by screws 39 shown in the plan view Fig. 4.

It will be observed from Figs. 3 to 6 that collimator housing 35 has a universal connection with bracket 22 through a pin and trunnion connection 40, and that spirit levels 41 and 42 are adjustably mounted upon level brackets 33 and 34 at right angles to one another, in any suitable manner, as for instance by studs 43 and lock nuts 44.

With further reference to lamp housing 38 (Fig. 3) it will be noted that a lamp socket 45 is mounted therein and carries a small electric lamp 46 the filament 47 of which is centrally disposed relative to the reticle 48. The reticle is preferably made from an opal diffusing glass and is provided with an etched grid 49 better shown in Figs. 6 to 9, the graduations of which represent mils. The reticle 48 is mounted within a ring or bezel 50 and the ring in turn is fastened within the collimator housing 35 by screws 51 in a manner clearly shown in Fig. 3.

A pair of mirrors 52—53, angularly displaced relative to one another and to the reticle 48, are held over openings in the housing 35 by clips 54 and screws 55, there being resilient pads or washers 56 between the mirrors and clips to cushion the mirrors against breakage.

Note is next to be made of objective lens 57 which is preferably in the form of an achromatic doublet composed of two elements 58 and 59 cemented together in the conventional manner and made from a suitable optical glass ground with great precision. The lens elements 58—59 are of the same diameter and fit snugly within a retainer ring 60 which is externally threaded and adjustably received by the threaded bore 61 in housing 35. The lens 57 is focused on reticle 48 in such a manner that a beam of light C is emitted from the collimator, the rays of which are parallel. After the lens 57 is properly focused with respect to reticle 48, ring 60 can be locked by a convenient set screw 62 carried by the collimator housing. Next the beam of light C is brought to a true vertical, in the usual and well known manner and then the levels 41 and 42 are adjusted by means of the studs 43 and lock nuts 44 until their bubbles 64 assume a neutral position.

From the foregoing detailed description of our improved test collimator, it will be understood that the first step towards checking the functions of a gyro-stabilized bombsight is to remove the glass plate from window 20 and mount the collimator on the sight housing by sliding the plate 23 into the grooves 21 in the manner heretofore explained. After the collimator has thus been mounted upon the bombsight the next procedure is to adjust the levelling or jack screws 28, 29 and 30 by turning their hand wheels 19 until the bubbles 63 and 64 of spirit levels 41 and 42 respectively assume a neutral position, or the position shown in Fig. 4. This insures that a vertical column of parallel light rays are emanating from the collimator within the field of view of the bombsight telescope 12.

Figure 1:
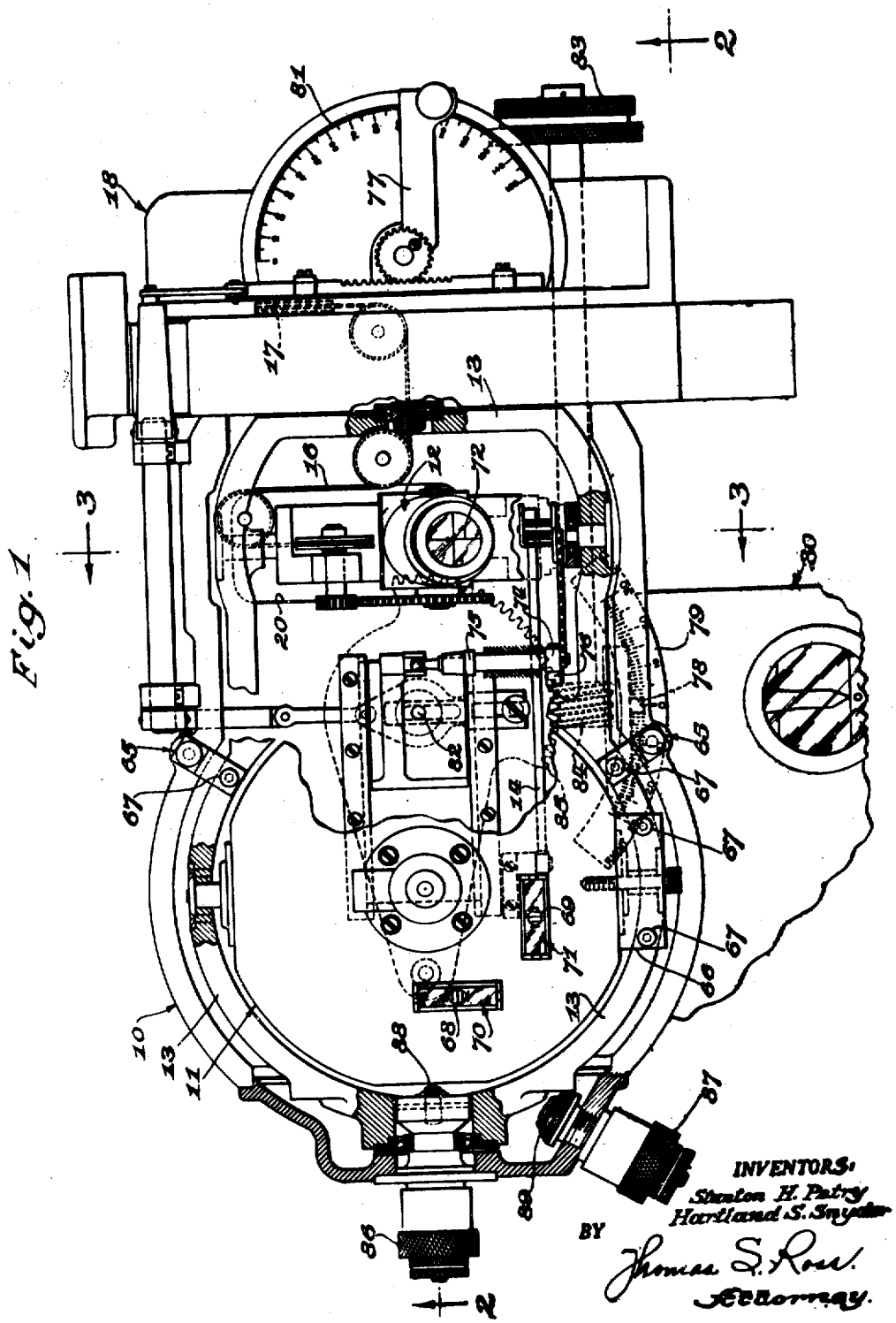
Fig. 1 is a fragmentary plan view of the gyro-stabilized bombsight with the upper half of its casing removed to clearly show the gyro and telescope, and with certain parts illustrated in horizontal cross section.

Next the gyro 11 is caged to bring its spin axis A—A to a true vertical position. This is accomplished by clamping the cardan 13 to the sight housing 10 by the use of removable and adjustable clamps 65 and by clamping the gyro 11 with respect to the cardan 13 by a similar clamp 66. Through proper adjustment of the clamp screws 67, the bubbles 68 and 69 of the gyro spirit levels 70 and 71, are brought to a neutral position (as shown in Fig. 1) and when in this position it is an indication that the spin axis A—A of gyro 11 is vertical. In the conventional manner the bombsight computer 18 is adjusted to a position which represents a zero sighting angle, and by observation of the grid 49 through the bombsight telescope 12, the telescope cross hairs 72 should coincide with the principal axes 73 of said grid 49 as illustrated in Fig. 8. If this condition does not exist it can be corrected in a fore and aft direction by changing the length of cable 16 through adjustment of drum 17 thus moving the mirror 15; and in an athwartship direction by changing the angular displacement of lever 74 (Figs. 1 and 2) with respect to lever 75 through adjustment screw 76. Thus, the optical axis B—B, of the telescope 12 has been brought parallel to the spin axis A—A of gyro 11 and this constitutes the first major adjustment of every bombsight.

Adjustment of the stabilized section of the sight so that movement of the trail arm 77 imparts no movement of the telescope cross hairs 72 relative to the grid 49 constitutes a second major check and adjustment of the sight. The procedure for this check and adjustment is begun by insuring that the pointer 78 (Fig. 1) carried by the sight is set at zero over the scale 79, the latter being mounted upon the stabilizer 80. Then the trail arm 77 is moved (as for example to 90 mils as illustrated in Fig. 1) with respect to its scale 81, and if this movement of the trail arm produces any movement of the telescope cross hairs 72, relative to the grid 49, it is an indication that the section of the sight stabilized in azimuth (indicated generally at 82 Fig. 1) is improperly adjusted. This can be corrected by rotating the stabilized section 82 of the sight with respect to the stabilizer 80. In a manner well known to those skilled in the art of gyro-stabilized bombsights, until no movement of the telescope cross hairs relative to the grid of the reticle is observed during movement of said trail arm.

Another test to be performed upon the bombsight, by the use of our novel test collimator, is a functional test which involves setting the trail arm 77 at a known value, say 90 mils on the scale 81 as shown in Fig. 1, then placing a given amount of drift in the sight. An example would be to set the pointer 78 to 30 degrees on the scale 79. This is accomplished by manually turning the drift knob 83 (clockwise for right drift and counterclockwise for left drift) which in turn, through means of worm 84 and toothed sector 85, rotates the sight with respect to the stabilizer 80. Then by observing the displacement of the telescope cross hairs 72 relative to the grid 49, such displacement should equal the trail times the sine of the drift angle, or 45 mils in the example given, and illustrated in Fig. 7.

The third major adjustment of the bombsight and the second functional test performed by the use of our invention will now be described in detail and relates to checking the performance of the gyro-telescope combination. First of all the sight is set with the fore and aft axis in one of the four cardinal headings, for instance north, with the gyro running at an approximate speed of 8,000 R. P. M. and when this speed is attained the gyro should be uncaged. The cross hairs 72 of telescope 12 should then be brought to zero position with respect to the principal axes 73 of the grid, as illustrated in the diagrammatic view Fig. 8. This is accomplished by simultaneously turning the manual levelling knobs 86 and 87 the first of which, through its roller 88, applies a torque to gyro 11 thus causing the cardan 13 to rock within housing 10 to bring the athwartship cross hair of the telescope into registry with the corresponding axis of the grid, and the second of which, through its roller 89, applies a torque to the cardan 13 thus causing the gyro 11 to rock within cardan 13 to bring the longitudinal cross hair of the telescope into registry with the corresponding axis of the grid.

When the telescope cross hairs are thus brought into registry with the principal axes of the grid, a definite period of time is permitted to elapse and the direction and amount of travel of the telescope cross hairs, with respect to the grid, represents the precession of the gyro due to the earth's rotation. This precession, or the precession of the gyro due to earth's rotation, is of a known value and in a generally easterly direction. Deviations from this known value represent a defective function of the gyro-cardan combination which may be caused by imperfect bearings, excessive bearing friction or an out of balance condition. These causes of deviations affect the precession differently in each of the four cardinal headings. By observing the direction and speed of the movement of the telescope cross hairs with respect to the grid, in each of the four headings, one skilled in the art of bombsights is enabled to determine the cause of any deviation from the known value. For example, travel of the telescope cross hairs across the grid is illustrated in Fig. 9, this movement being due to various causes of deviation such as a top or bottom heavy gyro, bad bearings, friction in the bearings, or an out of balance condition of the gyro-cardan combination. Accordingly, by checking the bearings and adjusting the gyro cardan balance until the precession maintains a pre-determined value in all four headings constitutes the third adjustment and second functional test completed through the use of our device.

While we have shown and described but a single embodiment of our invention, it will be apparent to those skilled in the art of bombsights that numerous changes may be made in the mechanical details thereof without departing from the principle of our invention. We, therefore, desire the scope of our protection to be limited only by the claims which follows:

We claim:

1. An instrument for testing and checking the telescope and static balance of a gyro-stabilized bombsight comprising, in combination, a bracket having means for detachably securing it to a fixed part of the bombsight; a collimator housing universally connected to said bracket; a pair of spirit levels carried by the housing and disposed at a right angle relative to one another; a plurality of levelling screws arranged to adjust said housing relative to said bracket to bring the bubble of said levels to a neutral position; a reticle mounted within said housing; a light source to one side of said reticle; and an objective lens positioned to receive light from the reticle and foused upon said reticle whereby a vertical column of light having parallel rays is emitted from the collimator, said ray of light being vertical when said spirit levels are in neutral position and being used in checking various positions of the bombsight telescope cross hairs with respect to said reticle, substantially as described and for the purposes set forth.

2. An instrument of the class described for checking and adjusting the telescope and static balance of bombsights comprising, in combination, a supporting bracket having means at one end thereof for removably and rigidly attaching it to the bombsight; a collimator housing universally connected to the other end of said bracket; levelling screws carried by the bracket; a pair of spirit levels mounted upon the housing, the bubbles of which are moved to a neutral position by adjustment of said levelling screws to bring said housing to a level position; an achromatic doublet objective lens and a reticle mounted within said collimator housing said reticle being positioned at the focal plane of the objective lens; and a light source unit mounted upon said housing adjacent one side of said reticle opposite to that of said objective lens; whereby, a vertical beam of light having parallel rays is emitted from the collimator housing, substantially as set forth and for the purposes specified.

3. An instrument of the character described for testing and adjusting the telescope and static balance of gyro-stabilized bombsights comprising, in combination, a collimator housing having means for universally connecting it to a bombsight for support thereby, means to adjust the collimator housing universally, means for indicating when the collimator housing is level, said collimator consisting of a reticle within the collimator housing, a light source positioned to illuminate the reticle, and an objective lens rendering parallel the light rays emanating from the collimator thereby to provide a definite optical reference direction for the testing adjustment of the bombsight.

4. An instrument for facilitating the testing and adjustment of gyro-stabilized bombsights and to determine when the optical axis of the bombsight telescope is parallel with the spin axis of the gyro comprising a collimator housing, a collimator within said housing and comprising a reticle, universally adjustable means to level and to secure the collimator housing to the bombsight to be tested, a light source illuminating the reticle, and an objective lens receiving light from the reticle, characterized by the fact that the collimator provides a vertical column of light rays usable as a definite reference direction in testing and adjusting the bombsight when the latter is fixed in a position such that the optical axis of its telescope is vertical.

5. In a bombsight the combination of a rigid frame, a telescope mounted in the frame and having means for changing the direction of its optical axis with respect to the frame, a gyroscope mounted in the frame and having a connection with the telescope operative to change the direction of its optical axis, and means for facilitating the adjustment of the optical axis of the telescope with respect to the spin axis of the gyroscope, to adjust the gyroscope and its connection with the telescope to a predetermined normal relationship comprising: a bracket having means for detachably securing it to the frame, a reticle housing, level indicating means on the housing, a universal joint connecting the housing to the bracket, means for universally adjusting and fixing the position of the housing with respect to the bracket, an illuminated reticle in the housing, and a lens to project the light from the reticle in parallel rays toward the telescope.

6. An instrument for testing and checking the telescope and static balance of a gyro-stabilized bombsight comprising, in combination, a bracket having means for removably connecting said instrument to the bombsight; a collimator housing universally connected to said bracket; a pair of spirit levels carried by said housing; means to adjust said housing relative to said bracket to bring the bubbles of said levels to a neutral position; a reticle supported within said housing; a light source disposed adjacent one side of said reticle; and an objective lens supported within said housing and in focus with said reticle to provide a vertical column of parallel light rays directed toward the field of vision of said telescope, and which are parallel to a ray of light which passes along the optical axis of the telescope when the latter is in static vertical position, and when the bubbles of said levels are in a neutral position.

7. An instrument of the character described for use in checking gyro-stabilized bombsights comprising, in combination, a telescopic bombsight viewing means, a collimator housing having means for universally adjusting and securing it in a predetermined position relative to the bombsight; means for indicating when the collimator is in said predetermined position; a reticle mounted within the collimator housing; said reticle having a rectangular cross line grid, the graduations of which are spaced to represent mils in the bombsight to be checked; a light source unit adjacent the reticle; and an objective lens rendering parallel the light rays of a vertical column of light emanating from the collimator housing, the construction being such that movement of the bombsight telescope cross-hairs relative to said grid graduations is utilized to check and adjust the telescope and static balance of the bombsight.

STANTON H. PETRY.
HARTLAND S. SNYDER.

REFERENCES CITED

The following references are of record in the file of this patent:

UNITED STATES PATENTS

| Number | Name | Date |
|---|---|---|
| 862,293 | Swasey | Aug. 6, 1907 |
| 1,434,209 | Hort | Oct. 31, 1922 |
| 1,449,527 | Mackensen | Mar. 27, 1923 |
| 1,524,788 | Gardner | Feb. 3, 1925 |
| 1,589,797 | Eppenstein | June 22, 1926 |
| 1,628,776 | Henderson | May 17, 1927 |
| 1,784,929 | Estoppey | Dec. 16, 1930 |
| 1,955,746 | Inglis | Apr. 24, 1934 |
| 2,129,130 | Hammer | Sept. 6, 1938 |
| 2,324,444 | Wappler | Apr. 13, 1943 |
| 2,364,152 | Macgill | Dec. 5, 1944 |
| 2,365,361 | Street | Dec. 19, 1944 |
| 2,382,631 | Harasta | Aug. 14, 1945 |
| 2,384,643 | Schade | Sept. 11, 1945 |